United States Patent [19]

Casalbore-Miceli et al.

[11] Patent Number: 4,943,499
[45] Date of Patent: Jul. 24, 1990

[54] CONDUCTOR POLYMERS USABLE IN THE CONSTRUCTION OF COMPLETELY DRY BATTERIES

[75] Inventors: Giuseppe Casalbore-Miceli; Giancarlo Beggiato, both of Bologna; Pier G. DiMarco, San Lazzaro di Savena; Gabriele Giro, Forlimpopoli, all of Italy

[73] Assignee: Consiglio Nazionale Delle Ricerche, Rome, Italy

[21] Appl. No.: 367,124

[22] Filed: Jun. 16, 1989

[30] Foreign Application Priority Data

Jun. 16, 1988 [IT] Italy ................ 20986 A/88

[51] Int. Cl.$^5$ .............................. H01M 6/18
[52] U.S. Cl. ...................... 429/192; 252/62.2
[58] Field of Search ............ 429/192, 191, 213; 252/62.2

[56] References Cited

U.S. PATENT DOCUMENTS 4,520,086 5/1985 Skotheim .................. 429/192
4,578,324 3/1986 Armand et al. ............ 429/192
4,584,251 4/1986 Hunziker ................. 429/191

*Primary Examiner*—Anthony Skapars
*Attorney, Agent, or Firm*—Birch, Stewart, Kolasch & Birch

[57] ABSTRACT

Conductor polymers prepared by anodic oxidation of compounds of general formula (I)

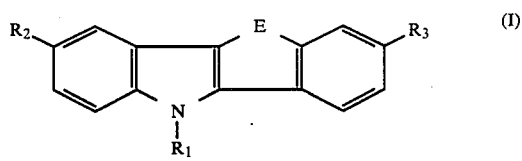

in which
E = O, S, Se;
$R_1$ = H or a saturated or unsaturated alkyl radical with double bonds in the vinyl or allyl position with respect to the nitrogen;
$R_2$, $R_3$ = H or methyl radicals.

These polymers have a cross-linked structure with intermonomer bonds in which possible in nitrogen-bonded vinyl groups and the aromatic rings are involved, and delocalized positive charges in the chain neutralized by counter-ions such as $Cl^-$, $BF^-_4$, $ClO^-_4$ or $PF^-_6$. These polymers can be used in the construction of rechargeable batteries of completely solid state.

20 Claims, 1 Drawing Sheet

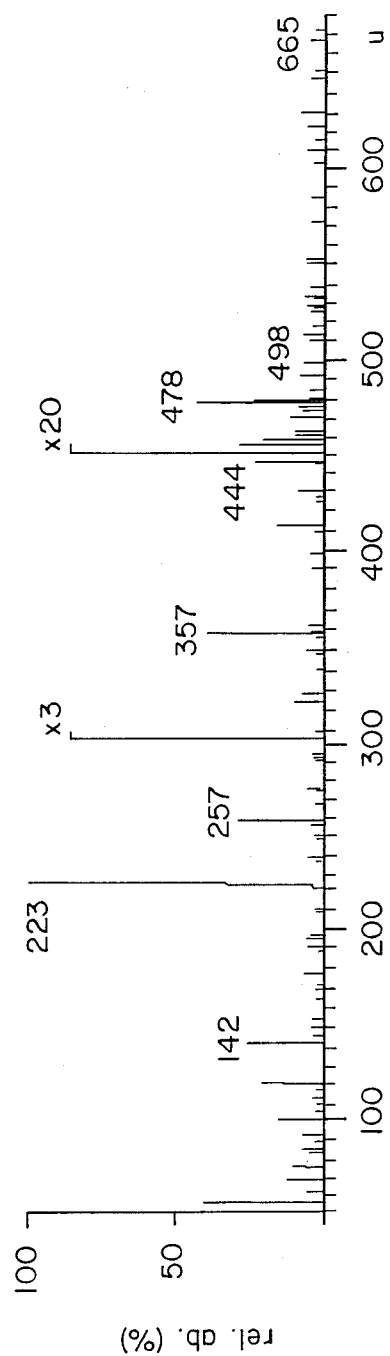

CONDUCTOR POLYMERS USABLE IN THE CONSTRUCTION OF COMPLETELY DRY BATTERIES

BACKGROUND OF THE INVENTION

1. Field of the Invention

This invention relates to organic polymers having delocalized positive charges in the chain neutralized by inorganic counter-ions, and suitable for use both as electrolytes and as electrode materials in the construction of completely dry batteries.

2. Prior art

Numerous conductor polymers and their relative preparation methods are known, these being based on electrochemical polymerization in the presence of an auxiliary electrolyte.

For example, a method for preparing polypyrrole is described in Japanese patent 131,104 (1986); a method for preparing polythiophene is described in Japanese patent 62,521 (1986); the preparation of polymers of aminochrysene, aminofluoranthene, aminophenanthrene, naphthylamine, 2-aminobenzimidazole and 2-aminobenzothiazole is described in Japanese patent 219,228 (1985).

These polymers have prospective applications of considerable importance as they can be used for battery electrodes, electrochemical sensors, electrochromic devices and other applications.

However, when used as electrodes, these polymers present self-discharge problems.

SUMMARY OF THE INVENTION

We have now discovered new conductor polymers prepared by anodic oxidation of compounds of general formula (I)

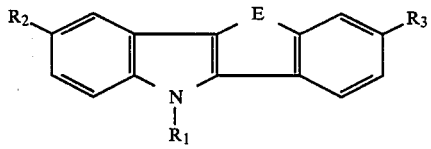

in which

E=O, S, Se;

$R_1$=H or a saturated or unsaturated alkyl radical with double bonds in the vinyl or allyl position with respect to the nitrogen;

$R_2$, $R_3$=H or methyl radicals, and having a cross-linked structure with intermonomer bonds in which possible nitrogen-bonded vinyl groups and the aromatic rings are involved, and delocalized positive charges in the chain neutralized by counter-ions such as $Cl^-$, $BF^-_4$, $ClO^-_4$ or $PF^-_6$.

The present invention also relates to the use of said polymers both as electrolytes and as electrode materials for the construction of completely dry batteries.

These polymers are not subject to significant self-discharge phenomena when used as electrolytes for the construction of completely dry batteries.

They are prepared by electrochemical polymerization of (I) by anodic oxidation in an organic solvent in the presence of a transport electrolyte which provides the counter-ion.

BRIEF DESCRIPTION OF THE DRAWINGS

FIG. 1 is the mass spectrum for the product.

DETAILED DESCRIPTION OF THE INVENTION

The characteristics of the polymers according to the present invention and of their preparation method plus their possible applications as battery electrolytes will be illustrated in detail in the following description.

The monomer (I) is prepared by known methods, for example monomer (I) can be prepared by N-vinylation of thionaphthene-indole applying the method used for the N-vinylation of carbazole described by G. R. Clemo, W. H. Perkin in J. Chem. Soc. Trans., 1924, 125, 1804. The product obtained can be purified chromatographically and characterized by NMR and MS.

Monomer (I) is dissolved in an organic solvent in a quantity such as to obtain a concentration of between $5.10^{-3}$ moles/liter and its solubility in the solvent itself. Suitable solvents are aprotic solvents such as $CH_2Cl_2$, $CH_3CN$, $C_6H_5CN$ and dimethylformamide.

The preferred solvent is $CH_2Cl_2$.

A transport electrolyte represented generically by MX in which M is Li, Na, K, $NR_4$ where $R_4$ is $C_1$-$C_4$ alkyl and X is Cl, $BF_4$, $ClO_4$ or $PF_6$ is added to the solution.

The preferred transport electrolyte is $NBu_4ClO_4$.

The transport electrolyte concentration in the solution is between 0.01 and 1 mole/l and preferably between 0.08 and 0.12 moles/l.

The method is preferably conducted in an anhydrous medium, however limited quantities of water of up to $10^{-2}$ moles/l do not negatively influence the process.

The oxygen has to be completely removed from the solution, this being preferably accomplished by bubbling an inert gas, through such as argon or nitrogen, through the solution and in addition the electrochemical process must be conducted in an inert gas atmosphere.

The electrodes of the electrolytic cell used for the electrochemical polymerization are of metal or metal oxide, preferably Pt, Au, steel or $SnO_2$. In the cell the cathode compartment is separated from the anode compartment by porous diaphragm means.

The cell is advantageously provided with a saturated calomel reference electrode.

The electrochemical polymerization is conducted at a constant potential of between +1 and +3.5 V and preferably between +1.2 and +1.3 V with respect to the saturated calomel electrode.

However it can also be conducted a constant current density, with the current density being between 0.6 and 3 mA/cm² and a potential difference being between the anode and cathode of about 100 V.

The polymerization is conducted at a temperature of between 10° and 40° C.

At the anode a black, oxidised, insoluble polymer deposit is obtained, and is washed with a solvent of the type used in the preparation, and then dried. Chemical, physico-chemical and electrical characterization tests are carried out on the product, together with applicational tests regarding its use as electrolytic material for batteries.

On elementary chemical analysis the polymer of the present invention obtained using N-vinylthionaphthene-indole (VTNI) as monomer and $NBu_4ClO_4$ as transport electrolyte consists of repetitive units of formula $[p(VTNI)^{y+}.yClO^-_4+zH_2O]_n$ in which there is a difference in hydrogen content with respect to the theoretical formula $C_{16}H_{11}SN$, due to bonds between the aromatic rings, whereas the bonds are prevalently on the side chain in accordance with the scheme:

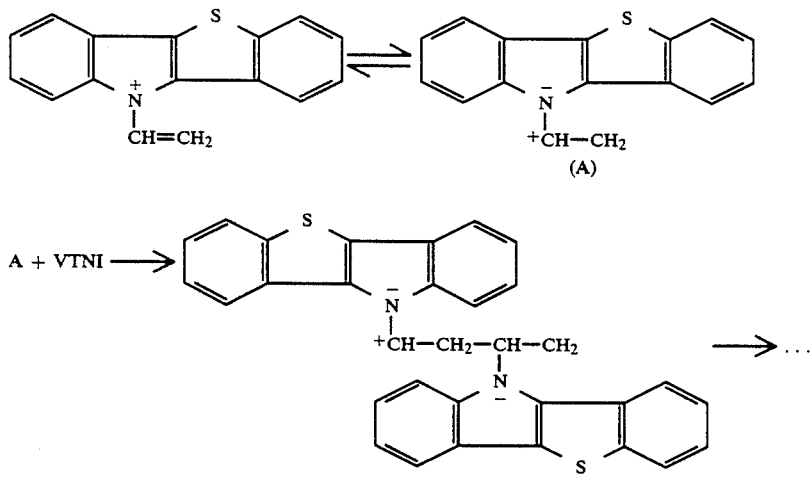

The mass spectrum for the product, shown in FIG. 1, indicates peaks relative to high-mass ions congruent with a polymer substance.

The results of the mass spectrometry measurements are given in Table 1, which shows the structure of some of the more significant ionic species.

These structures confirm that the polymerization takes place with the formation of bonds both between the vinyl groups and between the benzene rings.

Electrical conductivity tests were carried out on the polymer obtained, using the method described in G. Casalbore-Miceli, G. Beggiato, S. Dadio, P. G. Di Marco, S. S. Emmi, G. Giro, J. Appl. Electrochem. 17 (1987) 1111.

In the various examined samples the specific conductivity is between 0.97 and $1.1 \times 10^{-5}$ ohm$^{-1}$cm$^{-1}$.

The polymers according to the present invention were used with surprising results in the construction of solid rechargeable batteries in which the same polymers were shown to be able to operate both as electrolytes and as electrode materials. Consequently this application also constitutes a subject of the present invention.

The battery according to the present invention consists of the following elements all in the solid state:

$$(-)Me_1//[p(I)^{y+}.yX^-+zH_2O]_n//Me_2(+)$$

in which $Me_1$ is an oxidisable metal such as Zn, Cu, Fe and preferably Zn, $Me_2$ is a noble metal such as Au, Pt or metallic oxide, p(I) is the polymer according to the invention, $X^-$ is the counter-ion and z is a number between 1 and 2.

When $Me_1$ is Zn and $Me_2$ is Au, the battery can be charged to give an anodic potential of between 1.5 and 5 V at the electrode $Me_2$ with respect to the electrode $Me_1$.

The electrode processes can be schematised in the following manner:

$Me_1^{++}+2e^-\rightarrow Me_1$ (reaction at cathode)

$2P-2e^-\rightarrow 2P^+$ (reaction at anode)

where $P^+$ represents a delocalized positive site in the polymer chain.

When $Me_1$ is Zn and $Me_2$ is Au, the battery has an open circuit voltage of about 0.85 V.

When the element operates as a current generator (battery discharge), the following reactions occur:

$Me_2$(positive pole)$2e^-+2P^+\rightarrow 2P$ $Me_1$(negative pole)$Me_1-2e^-\rightarrow Me_1^{++}$ These reactions are evidenced by the following observations:

$Me_1$ is the negative pole of the battery;

after various cycles, whereas the $Me_2$/polymer interface does not appear modified, the $Me_1$/polymer interface appears pitted with the formation of an unidentified solid substance;

the battery voltage does not appear significantly modified when using an Au or Pt electrode for $Me_2$, whereas if a Zn, Cu or Fe electrode is used for $Me_1$ the battery voltage varies significantly;

the voltage agress well with the theoretical value for the aforesaid electrode reactions.

In the battery according to the present invention the polymer therefore acts both as the electrode material and as the solid electrolyte. In this respect, during operation of the battery as a generator, the voltage measured immediately after opening the circuit is less than the value which is gradually established on leaving the circuit open, whereas during operation of the battery as an electrolyzer (charge stage), the voltage measured immediately after opening the circuit is higher than that which is gradually established on leaving the circuit open.

There is thus a slow diffusion of the charges in the electrolyte and a polarization overvoltage at the electrodes. This has also been demonstrated by the difference in the specific resistance of the polymer when measured in an alternating field and in a direct field.

The diffusion overvoltage is therefore the "slow stage" in the battery operation. In this respect, a large variation in external resistance does not significantly influence the delivered current. Significant variations are obtained for loads of the order of 100 kohm.

The battery according to the present invention is particularly advantageous because of the following characteristics:

battery totally of solid state;
easy construction;
not subject to substantial self-discharge phenomena;
rechargeable for a large number of cycles;
light in weight;
non-polluting constituent material;
possibility of recovering the electrode materials;
possibility of assembling several elements to obtain high voltage;
protection from short-circuiting by internal polarization;
possibility of varying the internal resistance by dispersing salts of the electrode metal in the polymer electrolyte or subjecting the battery to preliminary cycles.

The battery can be used for example in watches, calculators, cardiac stimulators, microelectronics and portable instruments generally.

The following examples are given by way of non-limiting illustration of the present invention.

EXAMPLE 1

A solution of N-vinyl-thionaphthene-indole (VTNI) and tetrabutylammonium perchlorate (TBAP) in methylene chloride was fed into an electrolytic cell of capacity 4 ml.

The VTNI had been purified by chromatography and characterised by NMR and MS; the TBAP (Fluka purum) had been recrystallized from methanol and the methylene chloride had been distilled from $P_2O_5$ in a nitrogen atmosphere.

The VTNI concentration in the solution was $5 \times 10^{-2}$M and the TBAP concentration was 0.1M.

The electrolytic cell was provided with Pt electrodes, of which the anode was in the form of a platinum plate of area 1 $cm^2$. The cathodic compartment containing a platinum spiral was separated from the anodic compartment by a sintered glass diaphragm. The cell was also provided with a saturated calomel reference electrode.

The solution was degassed by bubbling nitrogen through in order to completely remove the oxygen, after which polymerization was commenced by electrochemical oxidation operating with a potential difference of 1.2 V. The polymerization was conducted at 22° C. in a nitrogen atmosphere.

The polymer deposited at the anode in the form of a black solid deposit with a yield of 76%.

From elementary chemical analysis the polymer was found to have the following formula: $C_{15.7}H_{10.5}N_{1.01}$ $0.682(ClO_4) + 1.3H_2O$.

The mass spectrum was as shown in FIG. 1. The specific conductivity was $1.1 \times 10^{-5}$ $ohm^{-1}cm^{-1}$.

EXAMPLE 2

The polymer obtained by operating in accordance with Example 1 was used to construct a rechargeable battery formed from the following elements:

all in the solid state and with the following constructional characteristics:

electrode diameter (Au and Zn) . . . 0.5 cm
electrode area . . . 0.196 $cm^2$
thickness of polymer layer (oxidised poly-VTNI powder compressed to 2 ton.) . . . 661 microns
weight of polymer (density about 1) . . . 13 mg
maximum current 20 $\mu A$; average current 2–3 $\mu A$ (load = 1000 O)

The battery was charged by providing a potential of 5 V at the Au anode with respect to the Zn, to obtain an open-circuit battery voltage of slightly less than 1 V. This voltage corresponds to the free energy of the following reactions taking place during the discharge stage:

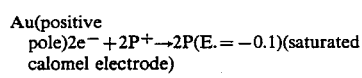

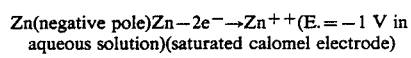

The ratio of delivered charge to supplied charge is close to 1.

The battery internal resistance varies with the number of cycles or on dispersing a Zn salt in the polymer electrode (2 MO-1600 O).

The theoretical capacity depends on the extent of polymer oxidation and can range from 55 to 80 Ah/kg of polymer.

EXAMPLE 3

A battery was constructed consisting of two elements as described in Example 2 but with the positive pole formed of platinum instead of gold. The electrodes were 1 $cm^2$.

The voltage was practically additive (1.9 V), the maximum current delivered was 400 $\mu A$ and the average current 30–40 $\mu A$.

TABLE 1

RESULTS OF MASS SPECTROMETRY MEASUREMENTS ON POLY VTNI'S

| m/z | empirical formula | structure formula |
|---|---|---|
| 665 | $C_{42}H_{23}N_3S_3$ | (structure shown) |

TABLE 1-continued
RESULTS OF MASS SPECTROMETRY MEASUREMENTS ON POLY VTNI'S
| m/z | empirical formula | structure formula |
|---|---|---|
| 498 | C$_{32}$H$_{22}$N$_2$S$_2$ | 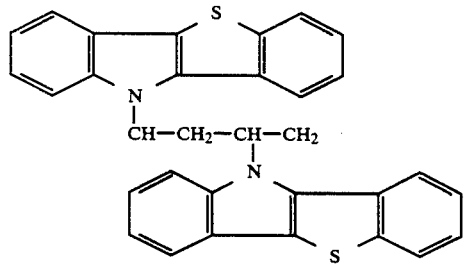 |
| 478 | C$_{31}$H$_{28}$NS$_2$ | 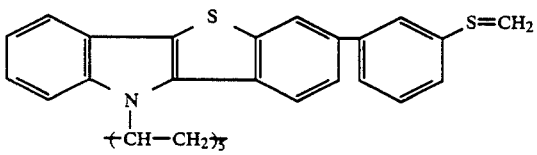 |
| | or C$_{33}$H$_{36}$NS | or 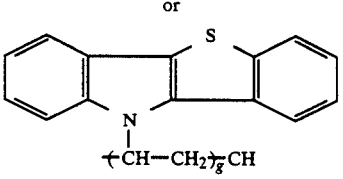 |
| 444 | C$_{20}$H$_{10}$N$_2$S$_2$ | 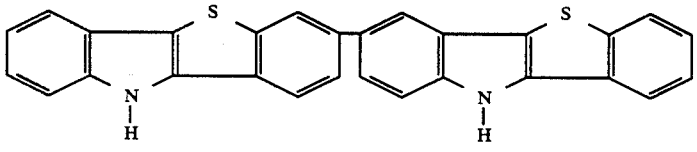 |
| 412 | C$_{20}$H$_{22}$NS$_2$ | 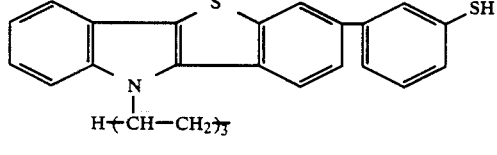 |
| | or C$_{28}$H$_{30}$NS | or 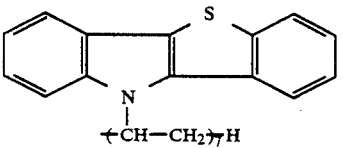 |
| 357 | C$_{22}$H$_{15}$NS$_2$ | 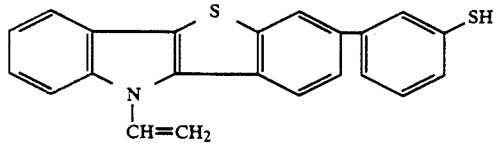 |
| | or C$_{24}$H$_{23}$NS | or 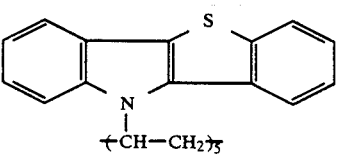 |

TABLE 1-continued
RESULTS OF MASS SPECTROMETRY MEASUREMENTS ON POLY VTNI'S

| m/z | empirical formula | structure formula |
|---|---|---|
| 325 | $C_{22}H_{15}NS$ | 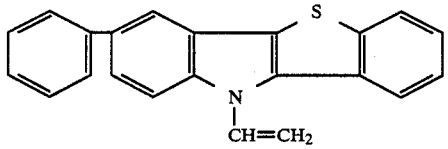 |
| 257 | $C_{18}H_{13}N_2$ | 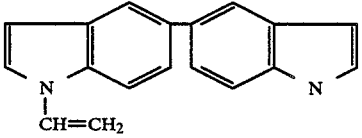 |
|  | or $C_{19}H_{29}$ | or $CH_2\!+\!CH\!-\!CH_2)_{\overline{9}}$ |
| 223 | $C_{14}H_9NS$ | 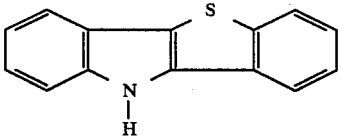 |
| 142 | $C_{10}H_8N$ | 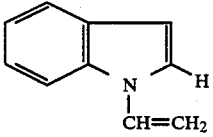 |
| 121 | $C_7H_5S$ | 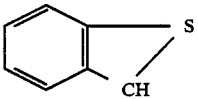 |
|  | or $C_9H_{13}$ | or $+CH\!-\!CH_2)_{\overline{4}}CH$ |
| 120 | $C_8H_{10}N$ | 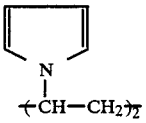 |
| 93 | $C_6H_7N$ | 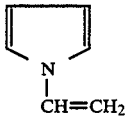 |
| 78 | $C_6H_6$ |  |

We claim:
1. A conductor polymer usable in the construction of completely dry batteries and having a cross-linked structure with intermonomer bonds formed through a nitrogen-bonded vinyl group and/or an aromatic ring, and having delocalized positive charges in the polymer chain neutralized by a counter-ion comprising $Cl^-$, $BF^-_4$, $ClO^-_4$, $PF^-_6$, or mixtures thereof, prepared by anodic oxidation of a compound of general formula (I)

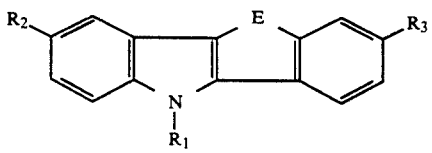

in which
E = O, S or Se;
$R_1$ = H or a saturated or unsaturated alkyl radical with double bonds in the vinyl or allyl position with respect to the nitrogen;
$R_2, R_3$ = H or a methyl radical.

2. A conductor polymer as claimed in claim 1, wherein said conductor polymer has an electrical conductivity of between 0.9 and $1.1 \times 10^{-5} \, \Omega^{-1} \, cm^{-1}$.

3. An anodic electrochemical oxidation method for preparing a conductor polymer usable in the construction of completely dry batteries and having a cross-linked structure with intermonomer bonds through a nitrogen-bonded vinyl group and/or an aromatic ring, and having delocalized positive charges in the polymer chain neutralized by a counter-ion comprising $Cl^-$, $BF^-_4$, $ClO^-_4$, $PF^-_6$ or mixtures thereof, which comprises oxidizing a compound of general formula (I)

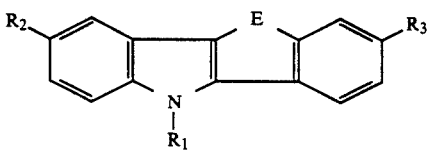

in which
E = O, S or Se;
$R_1$ = H or a saturated or unsaturated alkyl radical with double bonds in the vinyl or allyl position with respect to the nitrogen;
$R_2, R_3$ = H or a methyl radical,
by anodic electrochemical oxidation to polymerize the compound of formula (I), wherein said compound is dissolved in a medium comprising an aprotic organic solvent containing a transport electrolyte capable of supplying said counter-ion.

4. The method as claimed in claim 3, wherein said organic solvent is $CH_2Cl_2$, $CH_3CN$, $C_6H_5CN$ or dimethylformamide.

5. The method as claimed in claim 3, wherein said transport electrolyte is a compound MX in which M is Li, Na, K or $NR_4$, where $R_4$ is $C_1$-$C_4$ alkyl, and X is $ClO_4$, Cl, $BF_4$ or $PF_6$.

6. The method as claimed in claim 3, wherein said transport electrolyte is $NBu_4ClO_4$.

7. The method as claimed in claim 3, wherein the compound of general formula (I) is dissolved in said organic solvent in a quantity sufficient to obtain a concentration of between $5 \times 10^{-3}$ moles/l and the actual solubility of said compound in the solvent.

8. The method as claimed in claim 3, wherein said transport electrolyte is dissolved in said organic solvent in a quantity sufficient to obtain a concentration of between 0.01 and 1 mole/l.

9. The method as claimed in claim 3, wherein the medium is anhydrous or contains a quantity of water not exceeding $10^{-2}$ moles/l.

10. The method as claimed in claim 3, wherein the oxidation is performed in an oxygen-free medium and in an atmosphere of an inert gas.

11. The method as claimed in claim 3, wherein said anodic electrochemical oxidation is conducted in an electrolytic cell provided with electrodes of Pt, Au, Ni, steel or $SnO_2$.

12. The method as claimed in claim 3, wherein said anodic electrochemical oxidation is conducted at a constant potential, with an anodic potential of between 1 V and 3.5 V, with respect to a saturated calomel.

13. The method as claimed in claim 3, wherein said anodic electrochemical oxidation is conducted at a constant current density of between 0.6 and 3 mA/cm² and a potential difference between the anode and cathode of about 100 V.

14. The method as claimed in claim 3, wherein said anodic electrochemical oxidation is conducted at a temperature of between 10° and 40° C.

15. A rechargeable solid-state battery comprising an electrolyte, in which said electrolyte is a conductor polymer having a cross-linked structure with intermonomer bonds formed through a nitrogen-bonded vinyl group and/or an aromatic ring, having delocalized positive charges in the polymer chain neutralized by a counter-ion comprising $Cl^-$, $BF^-_4$, $ClO^-_4$, $PF^-_6$ or mixtures thereof and an electrical conductivity of between 0.9 and $1.1 \times 10^{-5} \, \Omega^{-1} \, cm^{-1}$, prepared by anodic oxidation of a compound of general formula (I)

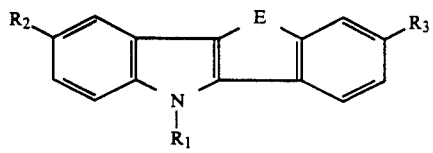

in which
E = O, S or Se;
$R_1$ = H or a saturated or unsaturated alkyl radical with double bonds in the vinyl or allyl position with respect to the nitrogen;
$R_2, R_3$ = H or a methyl radical,
forming the conductor polymer, said conductor polymer consisting of the elements:

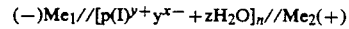
$(-)Me_1//[p(I)^{y+}y^{x-}+zH_2O]_n//Me_2(+)$ in which $Me_1$ is an oxidizable metal comprising Zn, Cu or Fe, $Me_2$ is a noble metal comprising Au, Pt or metallic oxide, p(I) is the polymer formed by the anodic oxidation of the compound of general formula (I), X is $ClO_4$, Cl, $BF_4$ or $PF_6$ and z is a number between 1 and 2.

16. The battery as claimed in claim 15, wherein $Me_1$ is Zn and $Me_2$ is Au.

17. A method of charging the rechargeable solid-state battery as defined in claim 15, which comprises applying an anodic potential of between 1.5 and 5 V to the $Me_2$ electrode with respect to the $Me_1$ electrode and having an open-circuit voltage of about 0.8 5 V.

18. A method of charging the rechargeable solid-state battery as defined in claim 16, which comprises applying an anodic potential of between 1.5 and 5 V to the Au electrode with respect to the Zn electrode and having an open-circuit voltage of about 0.85 V.

19. The method as claimed in claim 3, wherein said organic solvent is $CH_2Cl_2$.

20. The method as claimed in claim 3, wherein said transport electrolyte is dissolved in said organic solvent in a quantity sufficient to obtain a concentration of between 0.08 and 0.12 moles/l.

* * * * *